Oct. 7, 1924.

J. BERGE

SPEEDOMETER

Filed April 14, 1919  2 Sheets-Sheet 1

1,511,198

Inventor
Joseph Berge
By Attorney
Lloyd Blackmore

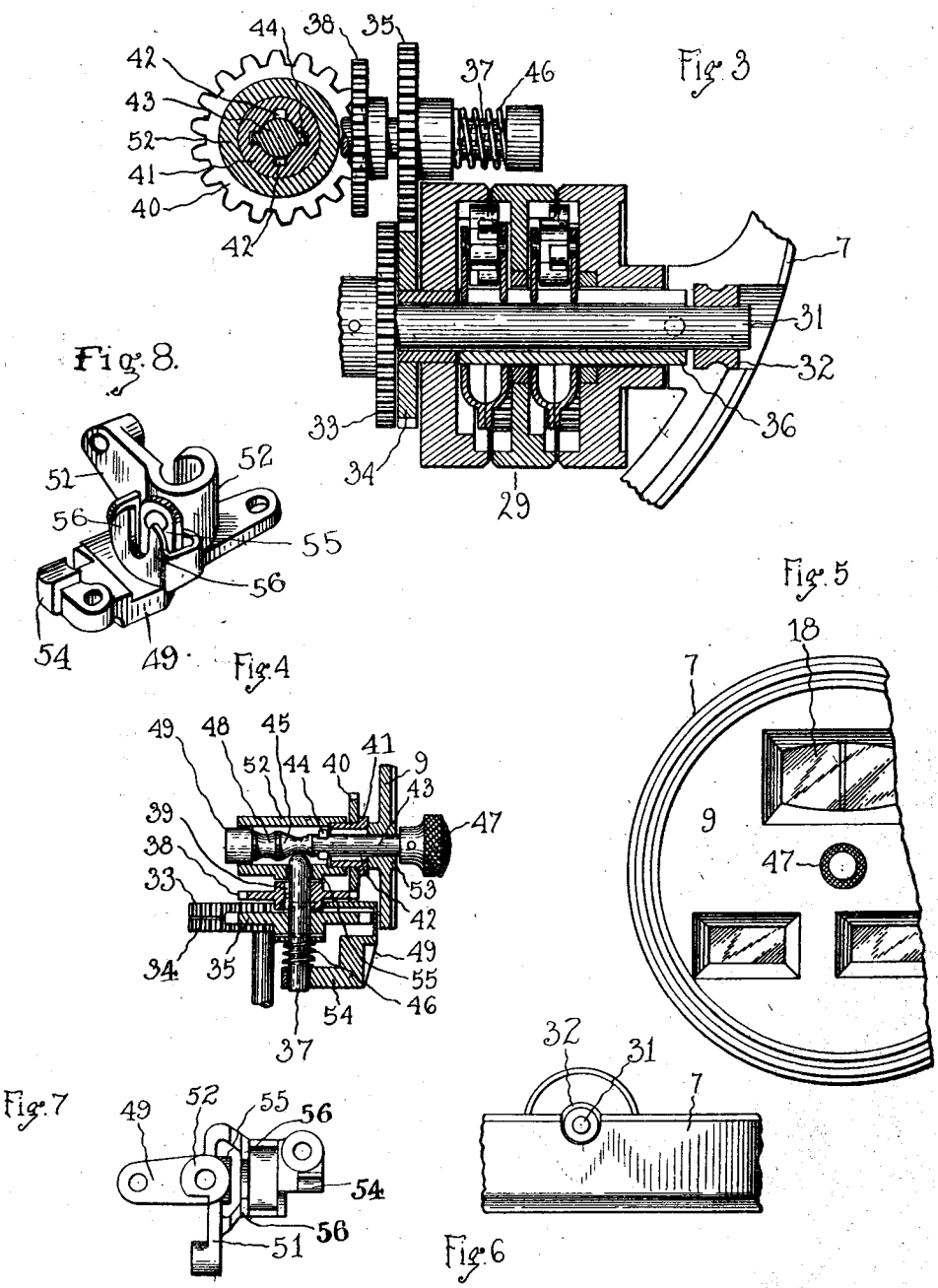

JOSEPH BERGE, OF FLINT, MICHIGAN, ASSIGNOR TO A C SPARK PLUG COMPANY, OF FLINT, MICHIGAN, A CORPORATION OF MICHIGAN.

SPEEDOMETER.

Application filed April 14, 1919. Serial No. 289,827.

*To all whom it may concern:*

Be it known that I, JOSEPH BERGE, a citizen of the United States, and resident of Flint, Genesee County, State of Michigan, have invented certain new and useful Improvements in Speedometers, of which the following is a specification.

My invention relates to speedometers designed to indicate the speed at which a vehicle is moving, and which instruments ordinarily include odometer mechanism for registering the distance travelled by the vehicle, the same being driven from a wheel of the vehicle and the odometer mechanism thereof ordinarily having two sets of odometer discs, one to register the distance travelled by the vehicle upon each trip or during each day, and having resetting means for moving the discs back to a zero reading after each trip, while the other set of discs is additive, and registers the total distance travelled by the vehicle upon its several trips or for an entire season.

My invention is illustrated as used with and as forming a part of a magnetic speedometer wherein a metallic speed cup having characters to indicate the speed of the vehicle is dragged along by the action of an armature rotating in a magnetic field in which the speed cup is located, although my invention may be used with speedometers of any type or class, or as an odometer only, in which case no speed indicating means would ordinarily be present.

The objects of my invention are to provide certain improvements in and relating to odometer mechanism broadly and generally considered, with the end in view of providing an odometer the various component elements or parts of which may be more readily assembled and adjusted among themselves than has heretofore commonly been the case, to provide an odometer in which the elements thereof form a complete unitary structure or mechanism which may be assembled by itself, and readily introduced into the casing of the instrument as a single mechanism or device complete in itself, and then secured in place therein, and as readily removed from the casing if and when it becomes necessary to do so, to provide various improvements in and relating to the mechanism provided for resetting the trip odometer discs to a zero reading, and to provide certain improvements in and relating to the disposition and arrangements of the various portions of the odometer mechanism relative to one another and to the casing of the instrument wherein the various parts thereof are contained.

With the above enumerated and other objects of invention in view, my invention consists in the improved odometer mechanism and subordinate parts and features thereof illustrated in the accompanying drawings and hereinafter described in detail, and particularly claimed in and by the concluding claims, and in such variations and modifications thereof as will be obvious to those skilled in the art to which my invention relates.

In the drawings accompanying and forming a part of this specification and wherein the preferred embodiment of my invention is illustrated:

Figure 3 is a view showing certain elements of the odometer mechanism upon a larger scale, and in section upon vertical transverse planes;

Figure 4 is a fragmentary sectional view upon a horizontal plane indicated by the line IV, IV, Figure 1;

Figure 5 is a view showing the instrument in part in elevation, the scale being somewhat smaller than in Figures 1 and 2;

Figure 6 is a view showing a portion of the casing section within which the odometer mechanism is located, in side elevation.

Figure 7 is a plan view of the odometer mechanism supporting bracket.

Figure 8 is a view showing the odometer mechanism supporting bracket in perspective.

Figure 1:
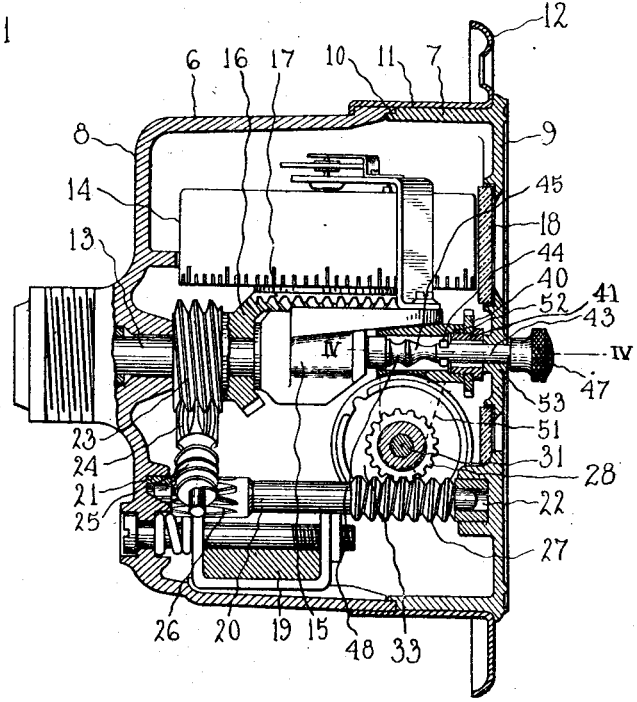
Figure 1 is a view mainly in section upon a vertical central plane extending longitudinally of the instrument.

Referring now to the drawings, the external casing of the instrument equipped with my improved odometer mechanism may be of any form, so far as concerns the greater part of the features of my invention, although certain features of the construction and arrangement of the casing are involved in my invention, regarded in certain of its aspects, as will hereinafter shaped casing sections 6, 7 annular in cross-section whereby a cylindrical hollow casing having end walls 8, 9 is provided, and within the latter of which sections the odometer mechanism is contained, the open ends of said section abutting along a joint at 10, and the said sections being secured together by an annular band or sleeve 11 forced onto the casing and overlaying the said joint, and having a flange 12 whereby the instrument may be secured in place in an opening in a dash or instrument supporting board of a vehicle.

The main driving shaft 13 of the speedometer is rotatable in a bearing supported by the end wall 8 of the casing, and 14 designates a speed cup rotatable about an axis extending at right angles to the axis of the driving shaft, and which element is supported by a bracket 15 secured in place within the casing. A rotatable armature not shown is located within the speed cup 14 and is driven off the driving shaft through bevel gears 16, 17, to thereby move the speed cup about its axis, the extent of such movement being dependent upon the speed at which the armature is driven from a wheel of the vehicle. The speed cup has numbers upon its periphery indicating the speed of the vehicle and which may be seen through a transparent member 18 secured within an opening provided in the casing section 7, and 19 is the magnet of the instrument, the poles of which lie close to the periphery of the speed cup and establish the magnetic field within which the said cup and the armature rotate.

The reference numeral 20 designates an odometer driving shaft arranged parallel with the main driving shaft and the ends of which are supported in bearings 21, 22 carried, respectively, by the end walls 8 and 9 of the casing, and which shaft is driven from the driving shaft through suitable gearing 23, 24, 25 and 26, and the said odometer driving shaft in turn drives the odometer mechanism of the instrument through a worm gear 27 and a pinion 28.

Figure 2:
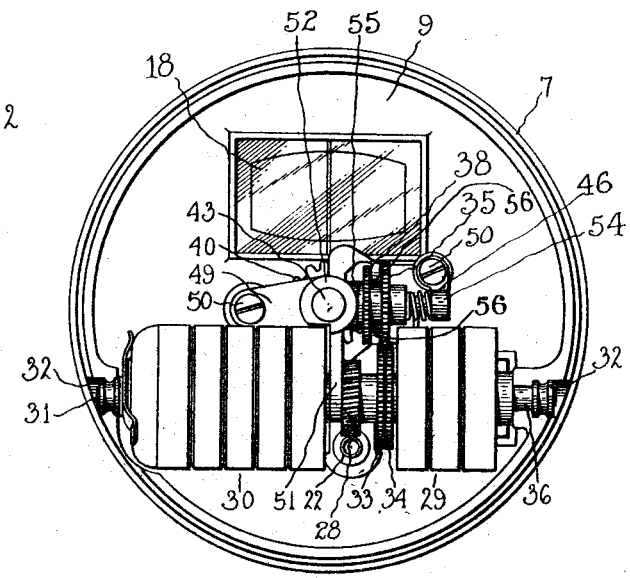
Figure 2 is a view showing the odometer mechanism assembled and in place within the casing section provided for it looking into said section and toward the front or exposed face or end of the instrument.

The odometer mechanism of the instrument comprises a plurality of trip odometer discs or wheels indicated collectively by the reference numeral 29, and a plurality of total odometer discs or wheels indicated collectively by the reference numeral 30, all of said discs being supported by an odometer shaft 31 the axis of which lies in a plane at right angles to the axes of the main driving and the odometer driving shafts 13, 20. The ends of this odometer shaft are supported in bearings 32 which in turn are supported in recesses or seats carried by or of the casing section, as best shown in Figure 2, said bearing members and the recesses or seats within which they are located being covered by the securing band or sleeve 11 when the instrument is assembled and in use. The said seats are preferably in the form of U-shaped open ended recesses formed in the peripheral wall of the casing section 7 and at the open end thereof where it abuts with the casing section 6 along the joint 10, and within which recesses the ends of the shaft 31 are supported, as best shown in Figures 2 and 6.

The pinion 28 is located between the season odometer discs 30 and the trip odometer discs 29, and the same is permanently secured to and rotates with the odometer shaft 31, and the season or total discs are supported from the said shaft, the furtherest of the said discs to the right, Figure 2, being the units disc, the next the tens, and so on toward the left, it being appreciated that this view is a view looking into the casing member and toward the front end thereof which is exposed when the instrument is in use.

The pinion 28 is permanently connected with a gear 33, the two being preferably made from a single piece of metal, and 34 designates a gear of the same diameter and having the same number of teeth as the gear 33 and arranged adjacent the same, and which two gears may be locked together, as shown in Figures 2 and 4, by a shiftable resetting gear 35, so that the right hand one of the trip odometer discs 29 with which the gear 34 is directly connected will be driven from the pinion 28.

The trip odometer discs to the right of the one driven directly from the pinion 28 as above explained rotate upon a hollow shaft or sleeve 36 supported by the shaft 31, but which sleeve is prevented from rotating by any suitable holding device. This sleeve also supports the carrying mechanism whereby each odometer disc is advanced one tenth of a rotation upon each complete rotation of the adjacent disc of the next lower denomination or order, as is usual in odometer mechanism, which carrying mechanism, however, is not disclosed in detail herein, as the same forms the subject matter of another application for patent executed and filed by me.

The shiftable resetting gear 35 is carried by and rotates with a freely rotatable and longitudinally movable shaft or support 37 and this gear, when the same is in the position in which it is shown in Figures 2 and 4 in which its teeth are in engagement with the teeth of both the gear 33 and the gear 34, locks the said gears together and serves to communicate rotary motion from the pinion The shaft 37 also carries a gear 38, the driving connection between the two being through a key on the shaft and a key-way in the gear, as shown at 39, Figure 4, so that the shaft may move through the gear while maintaining a permanent driving connection between the two, and the said gear 38 is in permanent operative engagement with a pinion 40 carried by and permanently connected with a rotatable hub or sleeve 41, the interior of which is provided with one or more key-ways 42, as best shown in Figure 3.

The reference numeral 43 designates a rotatable and longitudinally shiftable resetting member supported from the end wall 9 and centrally located relative thereto, and which member is movable along and rotatable about an axis parallel with and substantially coincident with the axis of the driving shaft 13, and said member is provided with a key 44 adapted to enter one of the key-ways 42 to thereby form a clutch and operatively connect the resetting member with the hub 41 and the pinion 40, which members obviously rotate about the axis of rotary and longitudinal movement of the resetting member 43. Said resetting member is provided with a conical cam 45 with which the end of the shaft 37 engages and whereby when said resetting member is moved to the right, Figures 1 and 4, the shaft will be moved along its axis against the action of a spring 46, and the resetting gear 35 which moves therewith will be moved into a position such that it will engage the teeth of the gear 34 only, as shown in Figure 3. The outward movement of the resetting member 43 moves the key 44 into one of the key-ways 42, thereby locking said member and the sleeve 41 and pinion 40 together, whereupon when the resetting member is rotated by the knob 47 the pinion 40 will be driven, and motion will be communicated to the left hand one of the tripodometer discs through the gears 40 and 38; the shaft 37, the resetting gear 35 and the gear 34 operatively connected with the trip odometer disc aforesaid, to thereby reset the trip odometer discs 29 of the instrument. The resetting member 43 is also provided with a groove 48 into which the rounded end of the shaft 37 snaps when the said member is in its extreme outward position, to thereby yieldably hold said member in proper position while it is being rotated to reset the trip odometer discs, as will be understood.

The gears above referred to whereby the resetting of the trip odometer discs is accomplished, as well also as the resetting member 43 and the shaft 37 which carries the resetting gear 35, are supported in 49 carried by the end wall 9 of the casing section 7 and secured thereto by screws 50, said bracket having a depending arm 51 provided with a bearing at its lower end for supporting the middle portion of the odometer shaft 31, and whereby when the bracket is secured to the wall 9 the said shaft will be held in place relative to the casing section 7, and the bearings 32 at the ends of said shaft will be held within the open U-shaped seats or recesses provided for them at the open end of the peripheral or side wall of said casing section. It therefore follows that the entire odometer mechanism may be assembled as a single unitary mechanism or device separate from the casing section 7, and then introduced thereunto and secured in place therein by the screws 50, the bearings 32 or the ends of the shaft 31 moving sidewise into the recesses or seats provided in the peripheral wall of the casing section for supporting the ends of the said shaft, and that the said mechanism may be as readily removed in its entirety from the casing section by removing the said screws.

The bracket 49 is provided with a tubular bearing 52 within which the resetting member 43 reciprocates and rotates. The outer portion of the resetting member moves in a bearing 53 in the end wall 9, and the rotatable hub or sleeve 41 which carries the pinion 40 is held in place between the bracket and the adjacent inner surface of the end wall 9, and is shown as having a bearing in the end of the tubular bearing 52.

The inner end of the shaft 37 which carries the shiftable resetting gear 35 extends through an opening in the wall of the bearing 52, as best shown in Figure 4, whereby a bearing is provided for the inner end of said shaft. The outer end of said shaft is supported by an arm 54 extending from the bracket 49 and between which and the resetting gear 35 the spring 46 aforesaid acts, and the gear 38 is kept in mesh with the pinion 40 and prevented from moving with the shaft 37 in a sidewise direction by a boss 55 upon the side wall of the tubular bearing 52, and by arms 56 carried by the bracket 49, as best shown in Figure 2.

While in the above explanation I have to a certain extent referred to the arm 51, the tubular bearing 52, the arm 54, the boss 55, and the arms 56 as though they were separate elements, it will be understood that all these elements and features are parts of the supporting bracket 49 whereby the entire resetting mechanism, with the exception of the bearing at 53 for the outer end of the resetting member 43, is supported, and that the said last mentioned bearing is provided more for the purpose of prevent-

I claim as new and desire to secure by Letters Patent is:

1. In odometer mechanism of the class described, a casing section having oppositely located U-shaped bearing seats provided in its peripheral or side wall; an odometer shaft the ends of which are supported within and are removable by lateral movement from said bearing seats; a plurality of odometer discs supported by said shaft; means for operating said discs; a bracket detachably secured to the end wall of said casing section; and a bearing carried by said bracket for supporting the central portion of said odometer shaft.

2. In odometer mechanism of the class described, a casing section having a peripheral or side wall annular in form; two oppositely disposed U-shaped recesses carried by said side wall and both located to one side of the horizontal diameter thereof; an odometer shaft the ends of which are supported within and are removable laterally from said recesses; a plurality of odometer discs supported by said shaft; means for operating said discs; a bracket detachably secured to the central portion of the end wall of said casing section; and an arm carried by said bracket and having a bearing for supporting the central portion of said odometer shaft.

3. In odometer mechanism of the class described, a casing section having oppositely located bearings provided in its peripheral or side wall; an odometer shaft the ends of which are supported within said bearings; a plurality of odometer discs supported by said shaft; means for operating said discs; a bracket secured to the end wall of said casing section; a bearing carried by said bracket for supporting the central portion of said odometer shaft; and resetting mechanism carried by said bracket for resetting said odometer discs.

4. In odometer mechanism of the class described, a casing section having a side wall annular in form, and an end wall; two oppositely disposed U-shaped recesses carried by said side wall and located both to one side of the horizontal diameter thereof; an odometer shaft having a centrally located driving pinion, the ends of which shaft are supported in said recess and are removable therefrom by lateral movement; a plurality of odometer discs supported by said shaft and operated by said pinion; a bracket secured to the central portion of said end wall; and an arm carried by said bracket and having a bearing for the central portion of said odometer shaft.

5. In odometer mechanism of the class described, a casing section having oppositely located U-shaped bearing seats provided in its peripheral or side wall; side of the horizontal diameter thereof; an odometer shaft having a centrally located driving pinion, the ends of which shaft are supported in said recesses and are removable laterally therefrom; a plurality of odometer discs supported by said shaft and operated by said pinion; a bracket secured to the central portion of said end wall; an arm carried by said bracket and having a bearing for the central portion of said odometer shaft; and resetting mechanism carried by said bracket whereby said odometer discs may be reset.

6. In odometer mechanism of the class described, a cup-shaped casing section having a side wall annular in form, and an end wall; two oppositely disposed U-shaped recesses carried by said side wall and both located to one side of the horizontal diameter thereof; an odometer shaft having a centrally located driving pinion, the ends of which shaft are supported in said recesses; a plurality of odometer discs supported by said shaft and operated by said pinion; a bracket secured to the central portion of said end wall; an arm carried by said bracket and having a bearing for the central portion of said odometer shaft; resetting mechanism carried by said bracket for resetting said odometer discs; and a rotary and reciprocating resetting member operable in a tubular bearing carried by said bracket and extending through said end wall for operating said resetting mechanism.

7. In odometer mechanism of the class described, a casing having an end wall; a bracket secured to said end wall; an odometer shaft the central portion of which is supported in a bearing carried by said bracket; bearings supported by said casing and wherein the ends of said odometer shaft are supported; a pinion located at the central portion of said odometer shaft; a gear secured to said pinion and rotating therewith; an odometer disc supported by said odometer shaft; a gear corresponding in size with said first mentioned gear and located adjacent the same, which gear is operatively connected with said odometer disc; a shiftable resetting gear carried by said bracket and adapted to mesh with both the gears aforesaid; means carried by said bracket for shifting said resetting gear into a position such that it will mesh only with the gear which operates said odometer disc; and resetting mechanism carried by said bracket and operatively connected with said resetting gear.

8. In odometer mechanism of the class described, an odometer shaft supported in suitable bearings, a driving pinion carried by and said disc, a second gear located adjacent said first mentioned gear and between the same and said odometer disc which gear is operatively connected with said odometer disc, a shiftable resetting gear adapted to mesh with both the gears aforesaid, means for shifting said resetting gear into a position such that it will mesh only with the gear which operates said odometer disc, and resetting mechanism operatively connected with said resetting gear.

9. In odometer mechanism of the class described, an odometer shaft supported in suitable bearings, a driving pinion carried by said shaft, an odometer disc supported by said odometer shaft, two gears concentric with said odometer shaft and located between said pinion and said disc, and which gears are connected to and rotate one with said pinion and the other with said disc, a shiftable resetting gear adapted to mesh with both the gears aforesaid, a rotatable and longitudinally movable resetting member, a pinion rotatable about the axis of said resetting member, gearing through which said resetting gear may be driven from said pinion, means whereby longitudinal movement imparted to said resetting member will shift said resetting gear into a position such that it will mesh only with the gear which operates said odometer disc, and means whereby said resetting member is operatively connected with said last mentioned pinion when said resetting member is moved longitudinally.

10. In odometer mechanism of the class described, an odometer shaft having a centrally located driving pinion; an odometer disc supported by said odometer shaft; two gears concentric with said odometer shaft and located between said driving pinion and said disc and which gears are secured one to each of said members so as to rotate therewith; a shiftable resetting gear adapted to mesh with both the gears aforesaid; a rotary and longitudinally movable resetting member, means whereby said resetting gear is moved into engagement only with the teeth of the gear which is connected with said odometer disc when said resetting member is moved longitudinally; and means whereby said resetting gear may be operated by said resetting member.

11. In odometer mechanism of the class described, an odometer shaft having a centrally located driving pinion; a gear rotating with said pinion; an odometer disc supported by said odometer shaft; a gear corresponding in diameter and number of teeth with said first mentioned gear and located adjacent the same, which gear is operatively connected with said odometer disc; aforesaid; a rotatable and longitudinally movable resetting member; a cam formed on said resetting member and adapted to engage the end of said shaft to thereby shift said resetting gear into mesh with only the teeth of the gear which operates said odometer disc; a pinion normally disengaged from and rotatable about the axis of said resetting member; means carried by said resetting member for locking said member and said pinion together so that the pinion may be rotated by the said resetting member; and a gear carried by the shaft which supports said resetting gear and adapted to operate the same, and with which gear said last mentioned pinion meshes.

12. In odometer mechanism of the class described, a bracket, an odometer shaft rotatable in a bearing carried by said bracket, a driving pinion carried by said shaft and located adjacent said bearing, a plurality of total odometer discs supported by said odometer shaft and located to one side of said bearing and driving pinion, a plurality of trip odometer discs supported by said odometer shaft and located to the other side of said bearing and driving pinion, means for operating both said sets of discs, and resetting mechanism carried by said bracket and located between said total and trip odometer discs for resetting said trip odometer discs.

13. In odometer mechanism of the class described, a bracket, an odometer shaft rotatable in a bearing carried by said bracket, a driving pinion carried by said shaft and located adjacent said bearing, a plurality of total odometer discs supported by said odometer shaft and located to one side of said bearing and driving pinion, a plurality of trip odometer discs supported by said odometer shaft and located to the other side of said bearing and driving pinion, an odometer driving shaft in operative engagement with said driving pinion and the axis of which is at one side of and extends at right angles to the axis of said odometer shaft, a reciprocating and rotatable resetting member carried by said bracket and movable along and rotatable about an axis extending at right angles to and located at the other side of the axis of said odometer shaft, and resetting mechanism carried by said bracket and operable by said resetting member and located between said total and trip odometer discs for resetting said trip odometer discs.

14. In odometer mechanism of the class described, a casing section having oppositely disposed U-shaped bearing seats in its peripheral or side wall; an odometer shaft the ends of which are supported within and are ber engaging said pinion to thereby drive said odometer shaft.

15. In odometer mechanism of the class described, a casing section having a peripheral or side wall annular in form; two oppositely disposed U-shaped recesses carried by said side wall and both located to one side of the horizontal diameter thereof; an odometer shaft the ends of which are supported within and are removable laterally from said recesses; a plurality of discs supported by said shaft; a driving pinion carried by said odometer shaft and through which the same is driven; and a driving member engaging said pinion to thereby drive said odometer shaft.

16. In odometer mechanism of the class described, a casing section having oppositely disposed U-shaped bearing seats provided in its peripheral or side wall; an odometer shaft the ends of which are supported within and are removable by lateral movement from said bearing seats; a plurality of odometer discs supported by said shaft; and a pinion carried by said odometer shaft and located centrally thereof, and through which said odometer shaft may be driven.

17. In odometer mechanism of the class described, a casing section having oppositely disposed U-shaped bearing seats provided in its peripheral or side wall; an odometer shaft the ends of which are supported within and are removable by lateral movement from said bearing seats; a plurality of odometer discs supported by said shaft; and resetting mechanism located adjacent the central portion of said odometer shaft and whereby said odometer discs may be reset.

In testimony whereof I affix my signature.

JOSEPH BERGE.